United States Patent
Fischer

(10) Patent No.: US 9,528,599 B2
(45) Date of Patent: Dec. 27, 2016

(54) METHOD FOR CONTROLLING AN AUTOMATIC TRANSMISSION

(71) Applicant: Bayerische Motoren Werke Aktiengesellschaft, Munich (DE)

(72) Inventor: Norbert Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/687,313

(22) Filed: Apr. 15, 2015

(65) Prior Publication Data

US 2015/0300483 A1 Oct. 22, 2015

(30) Foreign Application Priority Data

Apr. 16, 2014 (DE) ........................ 10 2014 207 368

(51) Int. Cl.
*F16H 59/58* (2006.01)
*F16H 61/02* (2006.01)
*F16H 61/16* (2006.01)

(52) U.S. Cl.
CPC .............. *F16H 59/58* (2013.01); *F16H 61/16* (2013.01); *F16H 2061/0234* (2013.01); *F16H 2061/168* (2013.01)

(58) Field of Classification Search
None
See application file for complete search history.

(56) References Cited

U.S. PATENT DOCUMENTS

| 4,788,892 A | 12/1988 | Komoda et al. |
| 5,361,207 A | 11/1994 | Hayafune |
| 2006/0122754 A1* | 6/2006 | McLaren .............. A01B 69/008 701/51 |
| 2008/0204214 A1* | 8/2008 | Reith ...................... B60T 8/172 340/441 |
| 2009/0055062 A1* | 2/2009 | Tsukada ................ E02F 9/2253 701/56 |
| 2011/0015844 A1 | 1/2011 | Perkins et al. |

FOREIGN PATENT DOCUMENTS

| DE | 36 15 961 A1 | 12/1986 |
| DE | 199 12 332 A1 | 11/2000 |
| DE | 692 33 515 T2 | 5/2006 |
| DE | 10 2010 017 647 A1 | 1/2011 |

OTHER PUBLICATIONS

German Search Report dated Feb. 23, 2015, with partial English translation (twelve (12) pages).

* cited by examiner

*Primary Examiner* — Edwin A Young
(74) *Attorney, Agent, or Firm* — Crowell & Moring LLP

(57) ABSTRACT

A method and electronic control unit are provided for controlling an automatic transmission by way of the electronic control unit in a motor vehicle during a skidding turn, during which the motor vehicle first travels straight with a velocity above a predefined threshold value or within a predefined range with the reverse gearspeed engaged and, subsequently, experiences a defined steering jolt, by means of which a rotational movement is initiated. When a defined rotational angle is exceeded, the automatic transmission is automatically shifted from the reverse gearspeed into a neutral position.

4 Claims, 1 Drawing Sheet

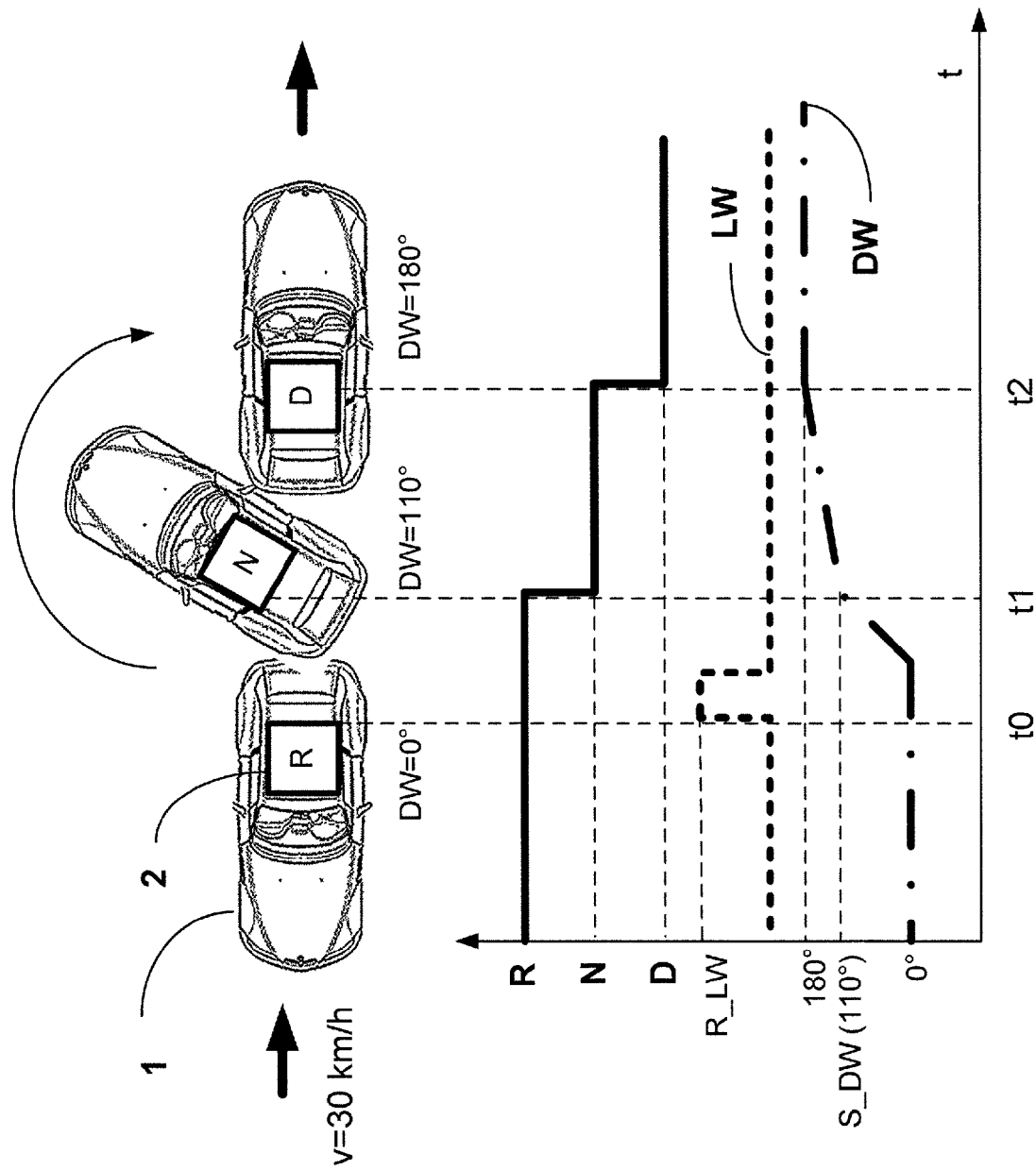

METHOD FOR CONTROLLING AN AUTOMATIC TRANSMISSION

CROSS REFERENCE TO RELATED APPLICATION

This application claims priority under 35 U.S.C. §119 from German Patent Application No. No. 10 2014 207 368.5, filed Apr. 16, 2014, the entire disclosure of which is herein expressly incorporated by reference.

BACKGROUND AND SUMMARY OF THE INVENTION

The invention relates to a method and control unit for controlling an automatic transmission.

Automatic transmissions which are actuated automatically by way of an electronic control unit, in particular in order to engage a specific gearspeed, have already been known in motor vehicles for many years. In this context, the driver is provided with a selector lever by which at least one reverse gearspeed R, a neutral position N and a forward travel position D can be preselected manually. For some time, the Applicant has offered such automatic transmissions (BMW Steptronic) with an electronic selector lever. The invention is based thereon.

The object of the invention is to assist the driver even in extreme driving situations.

This and other objects are achieved according to the invention by a method for controlling an automatic transmission by way of an electronic control unit in a motor vehicle during a skidding turn, during which the motor vehicle firstly travels straight with a velocity above a predefined threshold value or within a predefined range with the reverse gearspeed engaged and, subsequently, experiences a defined steering jolt, by which a rotational movement is initiated. When a defined rotational angle is exceeded, the automatic transmission is automatically shifted from a reverse gearspeed into the neutral position.

The invention provides a method for controlling an automatic transmission by way of an electronic control unit in a motor vehicle during a skidding turn, during which the motor vehicle first travels straight with a velocity above a predefined threshold value (for example of 20 km/h) or within a predefined range (for example 20 km/h<v<40 km/h) with the reverse gearspeed engaged and, subsequently, experiences a defined steering jolt, by which a rotational movement (spinning) is initiated. When a defined rotational angle (for example 110°) is exceeded, the automatic transmission is automatically shifted from the reverse gearspeed into the neutral position.

In one development of the invention, when an end of the rotational movement is detected (for example, by use of the wheel rotational speed sensors after a maximum rotational angle of, for example, 180° has been reached), the automatic transmission is preferably automatically shifted from the neutral position into a forward travel position.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE is a schematic illustration of a driving situation in which the method according to the invention is used.

DETAILED DESCRIPTION OF THE DRAWING

The drawing illustrates a driving situation in which the driver of a motor vehicle 1 is traveling straight in the reverse travel position or in the reverse gearspeed R with a velocity v of approximately 30 km/h and turns the steering wheel in a sharp fashion at the time t0. The result is that the vehicle rotates about its own axis through approximately 180° up to the time t2. During this driving situation, which is also referred to as a skidding turn, according to the invention, the automatic transmission is controlled automatically from R via the neutral position N into the (forward) travel position D by a detector function in the electronic control unit 2, independently of the activation of the selector lever by the driver. This requires an electronic selector lever which does not carry out any direct hydraulic interventions into the automatic transmission.

The detector function checks, by use of customary sensors (for example steering wheel angle sensor, wheel rotational speed sensors, yaw angle sensor), in particular, whether during the reverse travel a predefined minimum speed (for example, 20 km/h) is reached, whether a steering jolt R_LW, in particular a short and relatively strong change in the steering angle LW occurs, and whether a predefined threshold value S_DW is reached with respect to the rotational angle DW from the start of the spinning as a result of the steering jolt R_LW.

In the text which follows, the individual steps will be explained in more detail in the illustrated driving situation on the basis of the characterized profiles plotted against the time t:

1. From a starting position with a rotational angle DW of 0°, a motor vehicle 1 first travels straight with a velocity v above a predefined threshold value (for example, 20 km/h) or within a predefined range (for example 20, km/h<v<40 km/h). Here, the vehicle travels straight backward at a velocity v of 30 km/h here with the reverse gearspeed R engaged.

2. At the time t0, the driver generates a defined steering jolt R_LW, by means of which a rotational movement (spinning) is initiated.

3. When a defined rotational angle S_DW (for example 110°) is exceeded, according to the invention, the automatic transmission is shifted automatically from the reverse gearspeed R into the neutral position N by way of the electronic control unit 2.

4. When an end of the rotational movement is detected (for example by way of the wheel rotational speed sensors after a maximum rotational angle of, for example, 180° has been reached), the automatic transmission is shifted automatically from the neutral position N into a forward travel position D.

With this invention, a safe and fast skidding turn with a subsequent comfortable possibility for traveling on is provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for controlling an automatic transmission in a motor vehicle during a skidding turn, the method comprising the acts of:

determining, via an electronic control unit of the motor vehicle, that the motor vehicle is traveling straight in a reverse gear speed with a velocity above a predefined threshold value or within a predefined range;

determining, subsequently, via the electronic control unit, a defined steering jolt of the motor vehicle by which a rotational movement is initiated; and when a defined rotational angle of the motor vehicle is exceeded, automatically shifting, via the electronic control unit, the automatic transmission from the reverse gear speed into a neutral position.

2. The method according to claim 1, further comprising the act of:

detecting an end of the rotational movement of the motor vehicle; and automatically shifting, via the electronic control unit, the automatic transmission from the neutral position into a forward travel position.

3. An electronic control unit for an automatic transmission of a motor vehicle, comprising:

a computer readable memory of the electronic control unit, the computer readable memory having stored thereon program code that:

determines that the motor vehicle is traveling straight in a reverse gear speed with a velocity above a predefined threshold value or within a predefined range;

determines, subsequently, a defined steering jolt of the motor vehicle by which a rotational movement is initiated; and when a defined rotational angle of the motor vehicle is exceeded, automatically shifts the automatic transmission from the reverse gear speed into a neutral position.

4. The electronic control unit according to claim 3, wherein the computer readable memory of the electronic control unit further comprises program code that:

detects an end of the rotational movement of the motor vehicle; and automatically shifts the automatic transmission from the neutral position into a forward travel position.

\* \* \* \* \*